United States Patent [19]

Laquer et al.

[11] Patent Number: 5,167,386
[45] Date of Patent: Dec. 1, 1992

[54] PYROTECHNIC REMOVAL OF A RADOME COVER

[75] Inventors: Andrew G. Laquer, Tustin; Albert L. Bien, Anaheim, both of Calif.

[73] Assignee: Rockwell International Corporation, Seal Beach, Calif.

[21] Appl. No.: 822,770

[22] Filed: Jan. 21, 1992

[51] Int. Cl.⁵ .............................................. B64G 1/00
[52] U.S. Cl. ................................ 244/158 R; 244/121; 343/872; 102/378
[58] Field of Search .......... 244/158 R, 158 A, 117 A, 244/121, 120, 118.2, 3.25, 3.29, 3.15; 343/205, 208, 872; 102/377, 378

[56] References Cited

U.S. PATENT DOCUMENTS

| | | | |
|---|---|---|---|
| 3,301,184 | 1/1967 | Reinstein | 102/378 |
| 3,453,960 | 7/1969 | Qualls | 102/378 |
| 3,637,166 | 1/1972 | Nicholson et al. | 244/121 |
| 3,674,227 | 7/1972 | Jacobson et al. | 244/121 |
| 4,797,683 | 1/1989 | Kosowsky et al. | 343/872 |
| 4,867,357 | 9/1989 | Inglis et al. | 244/121 |

FOREIGN PATENT DOCUMENTS

| | | | |
|---|---|---|---|
| 2522613 | 9/1983 | France | 102/378 |
| 0371347 | 9/1963 | Switzerland | 102/378 |

*Primary Examiner*—Galen Barefoot
*Assistant Examiner*—Christopher P. Ellis
*Attorney, Agent, or Firm*—H. Fredrick Hamann; George A. Montanye; Tom Streeter

[57] ABSTRACT

Pyrotechnic removal of a radome cover may be accomplished by scoring longitudinal recesses 50, preferably at least four, on the inner surface 26 of the cover 18. Explosives cord 38, shaped to preferentially detonate outward, is placed in the recesses 50, and is backed with a backing 48 to prevent damage to the underlying radome 12. Annular explosive cord sections 40 and 42 are placed at the nose 28 and rear end 20 of the radome cover 18. A detonator 34 explodes all cords simultaneously.

13 Claims, 6 Drawing Sheets

PYROTECHNIC REMOVAL OF A RADOME COVER

This invention was made with Government support under Contract No. DASG60-87-C-0031 awarded by the Army. The Government has certain rights in this invention.

The present invention is directed at solving the same problem as is solved in U.S. patent application Ser. No. 07/709,270, filed Jun. 3, 1991, by Charles Thomas Brumbaugh, entitled "Removable Radome Cover," and assigned to the assignee hereof, the disclosure of which is hereby incorporated herein by reference.

BACKGROUND OF THE INVENTION

The present invention relates to apparatus for removing a protective cover from a radome, and has particular relation to such apparatus which operates explosively or pyrotechnically.

A missile may be constructed to home in on its target by means of a radar at its nose. This radar must be protected by a radome. The radome itself must be further protected, since the radar will not be operated until the terminal phase of the mission, but the radome will be subjected to high speed winds and other environmental conditions during the entire mission. When new, the radome is uniform and therefore has no effect, or, at least, a predictable effect, on the passage of radar beams through it. If it is ablated or otherwise damaged by wind or other environmental conditions, this uniformity and predictability disappears. It is therefore desirable to have a radome cover which is removed during the final moments of the mission, when the radar is actually in operation. The radome cover need not be manufactured to be uniform because it will become nonuniform during the initial and middle phases of the mission, and because it will be removed before the radar is actually turned on.

One possible means of removing a radome cover, as described in the Brumbaugh application referred to above, is to slit the front end of the cover and peal back the front end of the resulting strips. The self same wind whose existence caused the presence of the radome cover will then peal the radome cover off the radome, tearing the strips apart as it goes.

The foregoing radome cover removal system works well at high wind speeds and low temperatures. When temperatures get hot, however, the apparatus for spreading the nascent strips apart from the nose of the radome may simply sag into the radome cover rather than separate it from the radome, and the wind may be too weak to tear the strips from the radome. It is therefore important to have a positive system for removing the radome cover, especially in hot temperatures and low wind speeds. Further, the peeling strips of the radome cover of the Brumbaugh application must be fairly thin in order to tear apart from one another if the removal command is given at a relatively low missile speed. However, this necessary thinness may result in premature (uncommanded) removal of the cover at relatively high speeds. The radome cover of the Brumbaugh application therefore may be limited to use only at intermediate speeds.

SUMMARY OF THE INVENTION

The present invention overcomes the limitations of the prior art by providing longitudinal explosive cords between the radome cover and the radome, the simultaneous detonation of each cord separating the cover into segments, which may then fall or be blown off. Protection should be provided to keep the cord from damaging the radome, and the cord may be shaped to preferentially explode outward. An annulus at the nose and, preferably, also at the rear, of the radome cover may also be filled with explosive cord and simultaneously detonated, thereby providing for complete separation of each radome cover section from the others, as well as from the radome itself.

DETAILED DESCRIPTION OF A PREFERRED EMBODIMENT

Figure 1:
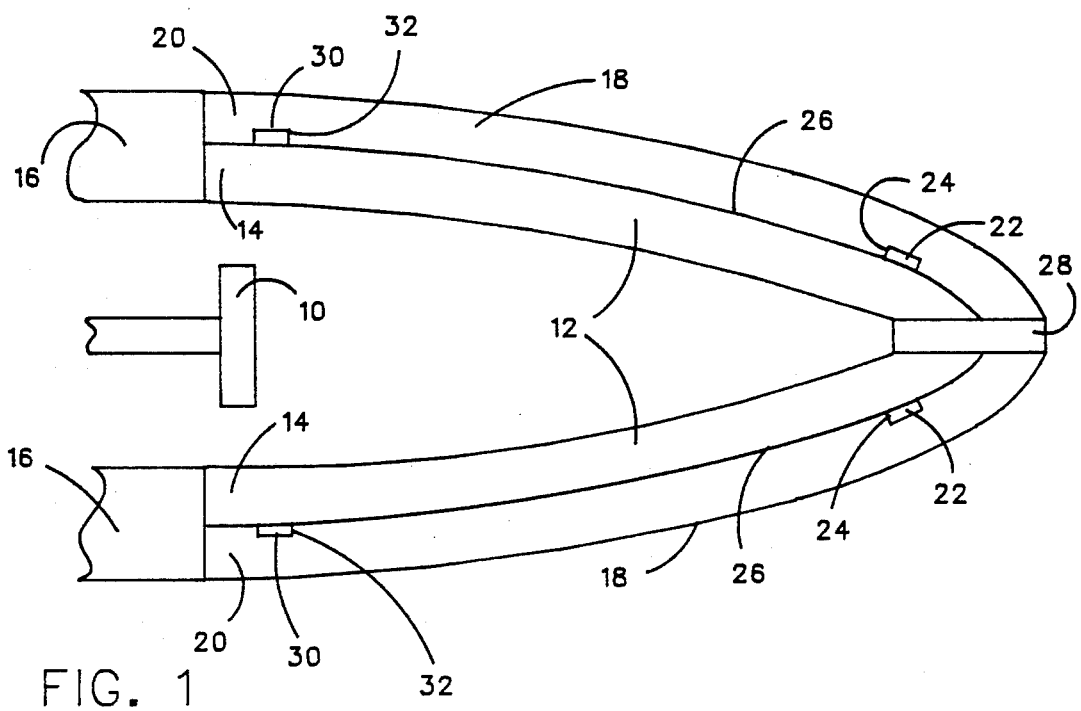
FIG. 1 is a longitudinal cross-sectional view of a radome and radome cover before removal.

In FIG. 1, a radar 10 is protected by a radome 12 which is supported at its rear end 14 by a radar housing 16. The radome 12 is covered by a radome cover 18 which is supported at its rear end 20 by the radar housing 16. An annular nose explosive cord 22 lies in an annular recess 24 on the inner surface 26 at the nose 28 of the radome cover 18. A similar annular rear end explosive cord 30 lies in an annular rear end recess 32 at the rear end 20 of the radome cover 18.

Figure 2:
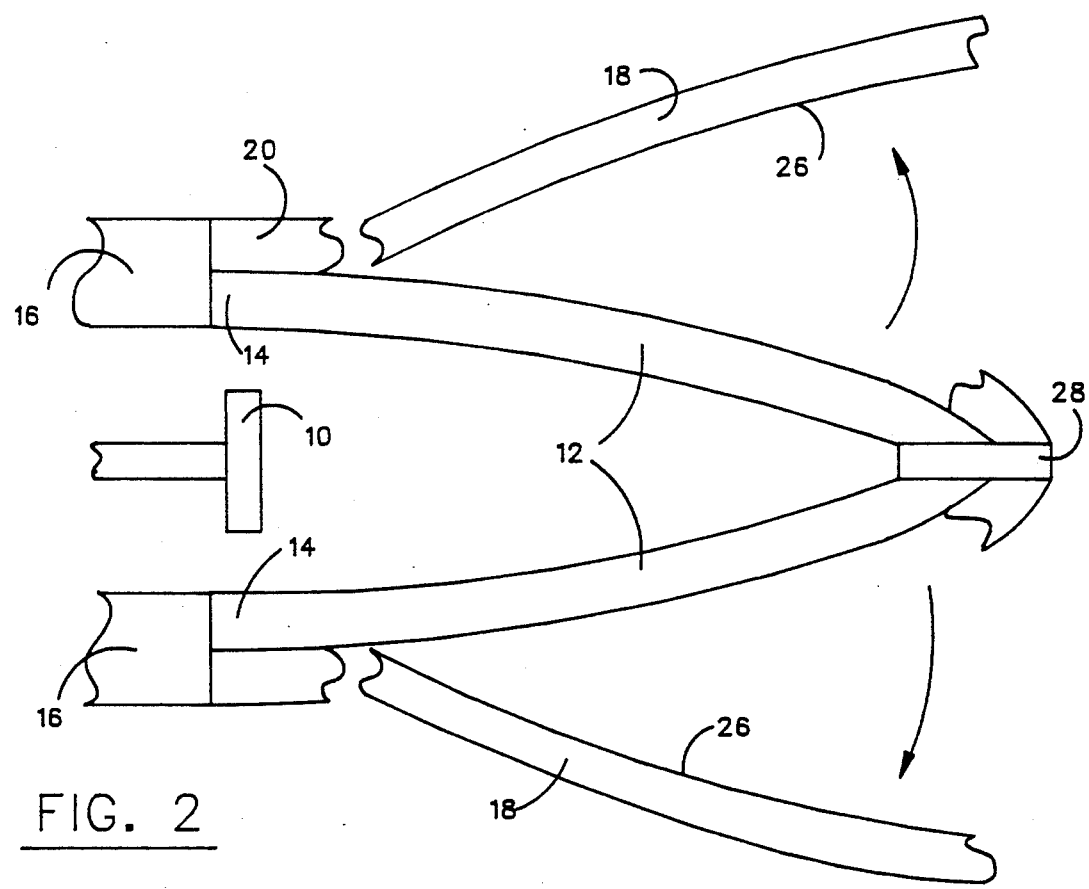
FIG. 2 is a longitudinal cross-sectional view of the radome and radome cover after detonation of the cord, but before the cover has been completely removed.

In FIG. 2, the explosive cords 22 and 30 (and the longitudinal cords described below) have been detonated, releasing the radome cover 18 from the radome 12. The radome cover nose 28 remains affixed to the radome 12, but is sufficiently small and close to the radar 10, considering the width of the beam emerging from the radar 10, as to provide no significant interference to the beam emitted from the radar 10.

Figure 3:
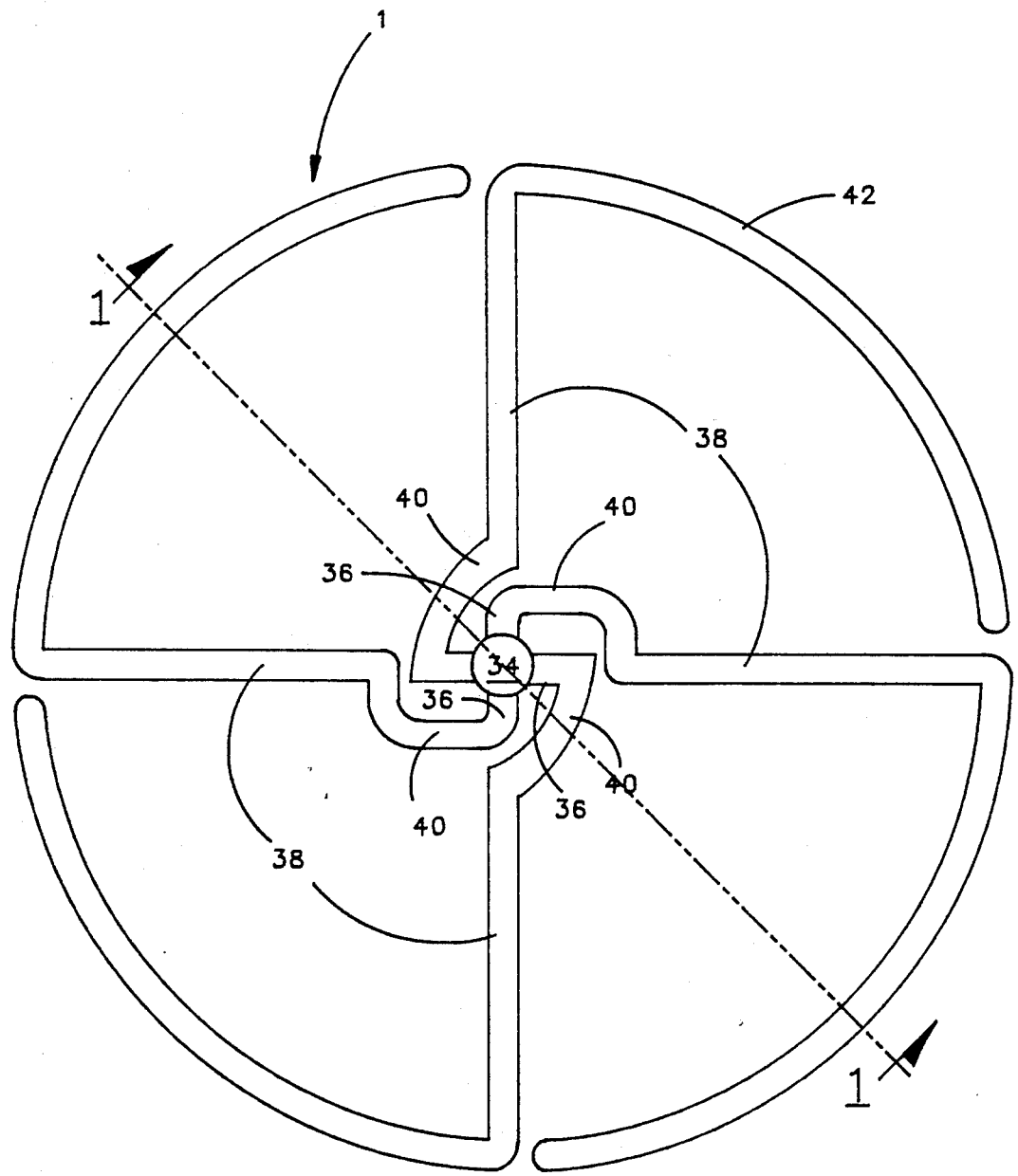
FIG. 3 is a plan view of the configuration of the explosive cord, as seen from the nose of the radome cover.

In FIG. 3, a detonator 34 detonates an initial section 36 of each of a plurality of longitudinal explosive cords 38. The initial section 36 of each cord 38 drives an azimuthal nose explosive cord section 40, which in turn drives the remainder of the longitudinal explosive cord 38. The azimuthal nose explosive cord sections 40 together form the annular nose explosive cord 22 at the radome cover nose 28 heretofore referred to. The longitudinal explosive cords 38 in turn each terminate in an azimuthal rear end explosive cord section 42 at the rear end 14 of the radome 12. The azimuthal rear end explosive cord sections 42 together form the annular rear end explosive cord 30. All cords are detonated simultaneously.

Figure 4:
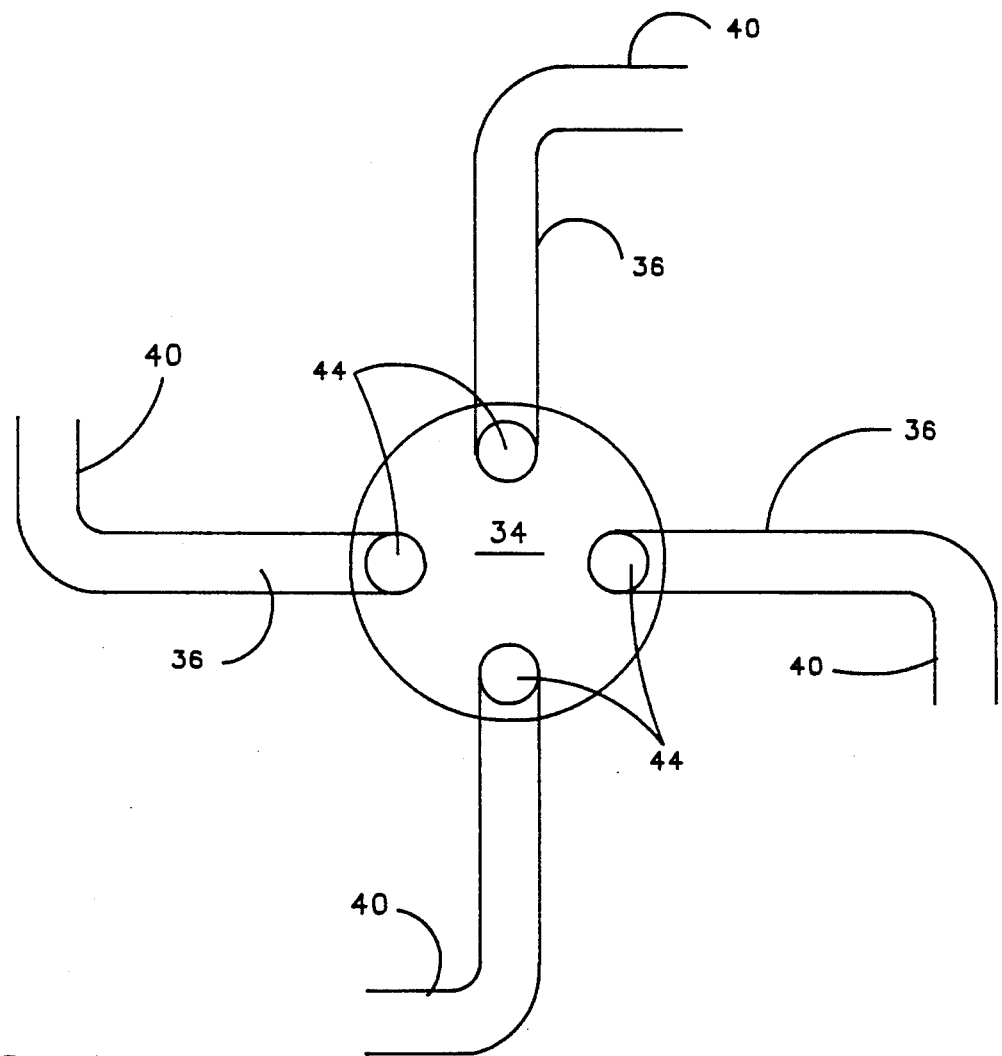
FIG. 4 shows how the detonator at the nose of the radome cover may be subdivided into sub-detonators, one for each explosive cord.
Figure 5:
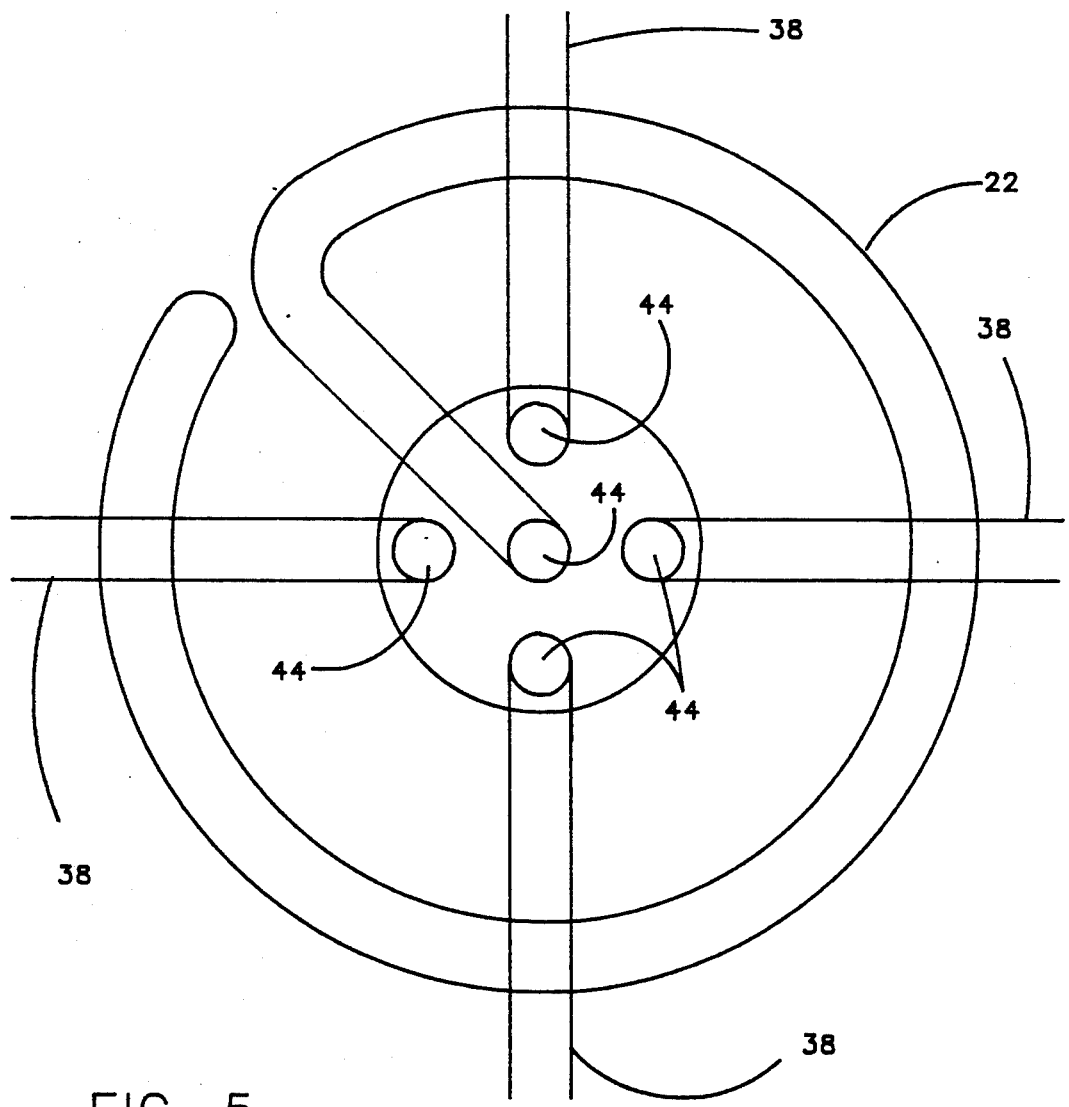
FIG. 5 is similar to FIG. 4, except that it depicts an additional sub-detonator for an annular explosive cord at the nose of the radome cover.

As shown in FIG. 4, the detonator 34 may comprise a plurality of sub-detonators 44, each sub-detonator 44 being connected to a respective initial section 36 of a longitudinal explosive cord 38. Alternatively, as shown in FIG. 5, an additional sub-detonator 44 may drive an annular nose explosive cord 22 which is entirely separate from the longitudinal explosive cords 38, each of which is also connected to a respective sub-detonator 44.

Figure 6:
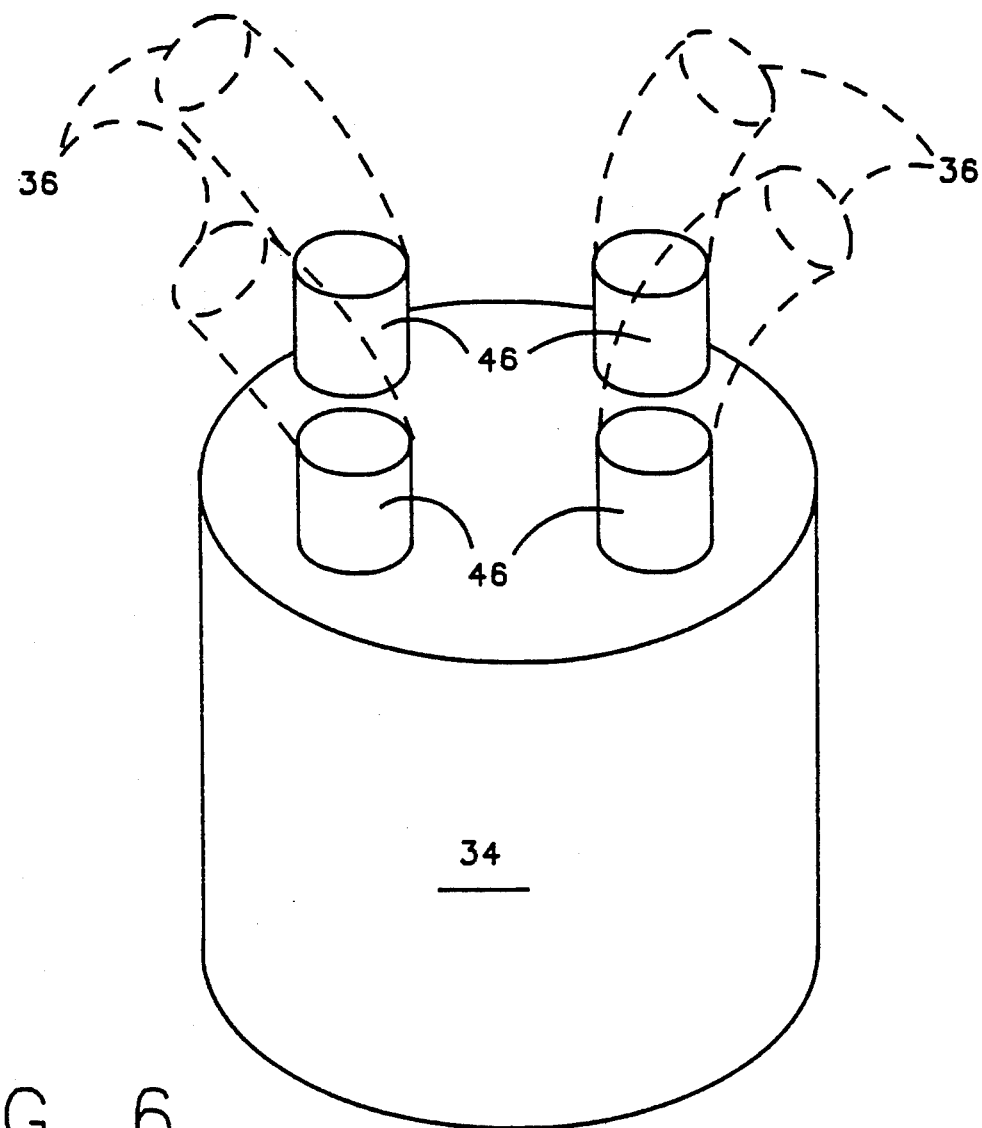
FIG. 6 shows how a single detonator may, through a plurality of initiators, detonate a like plurality of explosive cords.

As shown in FIG. 6, each initial section 36 of a longitudinal explosive cord 38 may be driven by a separate initiator 46, all of which, in turn, are driven by the detonator 34. Initiators 46 may be substituted for sub-detonators as otherwise shown herein.

Figure 7:
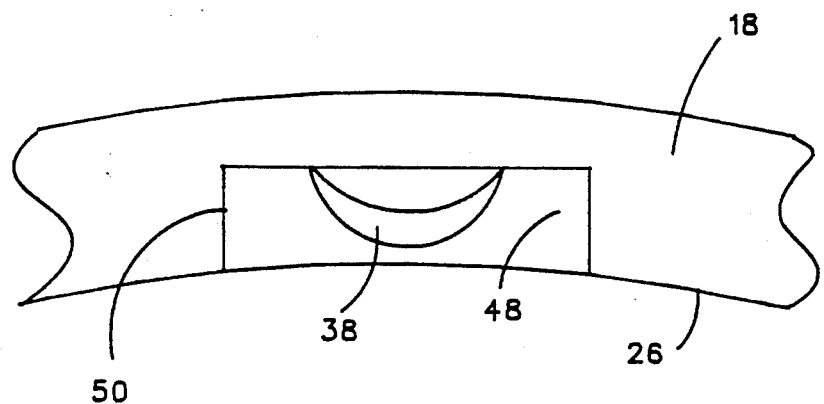
FIGS. 7, 8, and 9 show transverse cross-sections of various versions of a longitudinal explosive cord and its backing.
Figure 8:
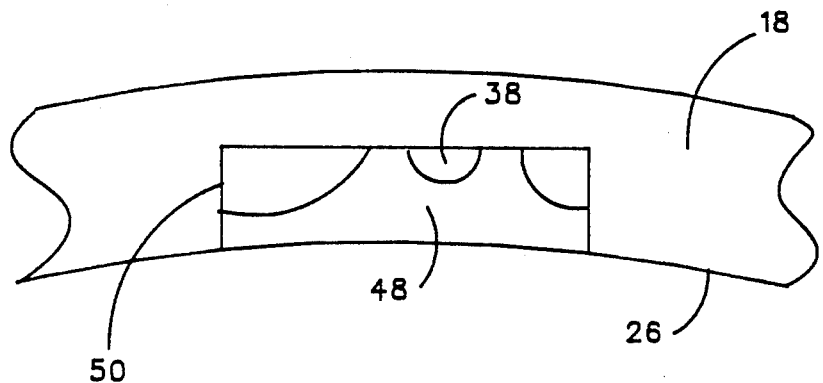
Figure 9:
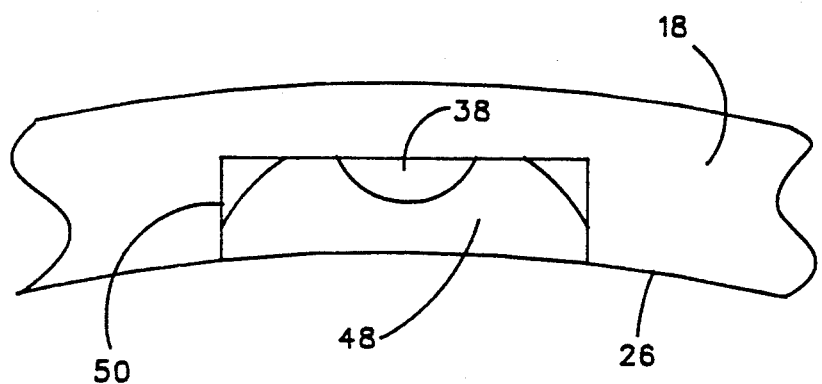

FIGS. 7, 8, and 9 depict cross-sections of a variety of longitudinal explosive cords 38, each shaped to preferentially explode outward. Each cord 38 is backed by an energy absorbing backing 48 so as to protect the underlying radome 12 from damage. The material from which the backing 48 is made may include plastic (preferably lexan), hard rubber, or any other suitable material. The cord 38 and backing 48 are both contained within a longitudinal recess 50, each recess 50 being defined by walls or other similar means on the inner surface 26 of the radome cover 18. Similar shaping and backing 48 is preferably also applied to all other explosive cords, such as the azimuthal explosive cord sections 40 and 42.

HNF-2A brand explosive cord, manufactured by Ensign Bickford Inc. of Simsbury, Conn., is a suitable explosive cord. It is encased in a soft aluminum shell which can be re-rolled into any reasonable shape desired. It has the additional desirable features of long shelf life (30 years, depending on storage temperature) and high temperature tolerance (400 degrees F. for long periods; melting point 585–600 degrees F.). Other explosive cords may be used depending on the required shelf life and temperature range needed for the desired application. PBXN-301 (Plastic Bonded Explosive Navy) brand explosive cord, manufactured by the same manufacturer, is suitable for less demanding applications, having a melting point of 286 degrees F. and a shelf temperature of up to 212 degrees F. EXTEX brand explosive cord, manufactured by Unidynamics Phoenix Inc., of Goodyear, Ariz., is similar to PBXN-301. Regardless of the cord selected, it should be formable or extrudable. The grains per foot power level of the explosive should be controllable and the explosive should have propagation reliability.

INDUSTRIAL APPLICABILITY

The present invention is capable of exploitation in industry, and can be used, whenever positive removal of a radome cover is required over a broad range of temperatures and wind speeds. The present invention is capable of being made from components which, taken separately and apart from one another, may be entirely conventional, or it may be made from their nonconventional analogs.

While several preferred embodiments have been described in some detail herein, the true spirit and scope of the present invention are not limited thereto, but are limited only by the appended claims.

What is claimed is:

1. A cover for a radome and apparatus for removing the cover from the radome, said cover including a nose and a rear end, the cover and apparatus comprising:
   (a) means defining a plurality of spaced apart longitudinal recesses in an inner surface of the radome cover, the recesses extending from the radome cover nose to the radome cover rear end;
   (b) a like plurality of longitudinal explosive cords, each longitudinal explosive cord extending in a respective longitudinal recess from the radome cover nose to the radome cover rear end;
   (c) a like plurality of energy-absorbing longitudinal backings, each longitudinal backing extending inwardly from and along with one of said longitudinal explosive cords from the radome cover nose to the radome cover rear end; and
   (d) a detonator connected to detonate the longitudinal explosive cords.

2. The device of claim 1, wherein the detonator is situated at the radome cover nose.

3. The device of claim 1, wherein the plurality of spaced apart longitudinal recesses, of longitudinal explosive cords, and of energy-absorbing longitudinal backings, is at least four.

4. The device of claim 1, wherein the detonator comprises a like plurality of sub-detonators, each sub-detonator being connected to a respective longitudinal explosive cord.

5. The device of claim 1, further comprising a like plurality of initiators, each initiator being connected to transfer an explosion from the detonator to a respective longitudinal explosive cord.

6. The device of claim 1, wherein the backings comprise a material including hard rubber.

7. The device of claim 6, wherein the backings comprise a material including plastic.

8. The device of claim 7, wherein the plastic comprises lexan.

9. The device of claim 1, wherein the longitudinal explosive cords are shaped to preferentially explode outward.

10. The device of claim 1, further comprising:
    (a) means defining a nose annular recess in the inner surface of the radome cover at the radome cover nose; and
    (b) an annular nose explosive cord in the nose annular recess, the annular nose explosive cord being connected to be detonated by the detonator.

11. The device of claim 10, wherein the annular nose explosive cord comprises a plurality of azimuthal nose explosive cord sections, each azimuthal nose explosive cord section being connected between the detonator and a respective longitudinal explosive cord.

12. The device of claim 1, further comprising:
    (a) means defining a rear end annular recess in the inner surface of the radome cover at the radome cover rear end; and
    (b) an annular rear end explosive cord in the rear end annular recess, the annular rear end explosive cord being connected to be detonated by the detonator.

13. The device of claim 12, wherein the annular rear end explosive cord comprises a plurality of azimuthal rear end explosive cord sections, each azimuthal rear end explosive cord section being connected to a respective longitudinal explosive cord.

* * * * *